B. BROWER & T. A. WEBER.
SHARPENING DEVICE FOR KNIVES AND THE LIKE.
APPLICATION FILED JULY 3, 1909.
989,692.
Patented Apr. 18, 1911.
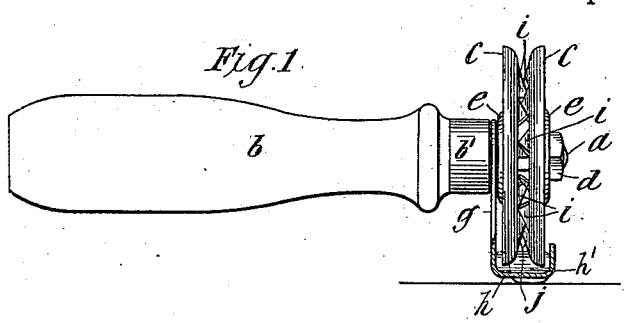
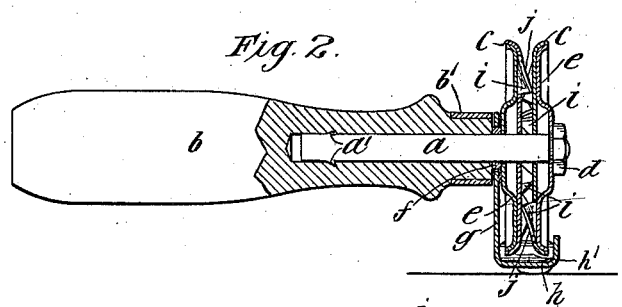
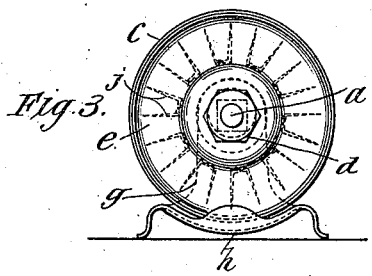
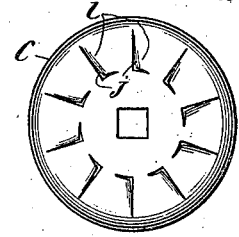
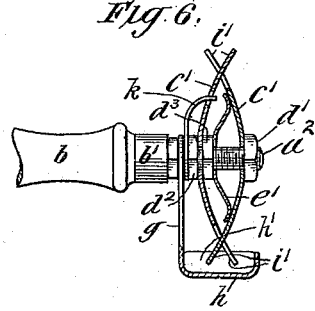
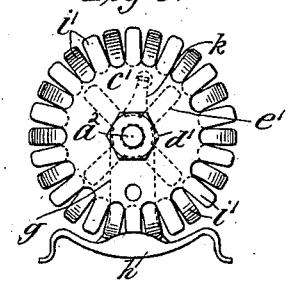
Witnesses:
Inventors:
Bloomfield Brower
Theodor A. Weber
by their Attys

UNITED STATES PATENT OFFICE.

BLOOMFIELD BROWER AND THEODORE A. WEBER, OF NEW YORK, N. Y.

SHARPENING DEVICE FOR KNIVES AND THE LIKE.

989,692. Specification of Letters Patent. Patented Apr. 18, 1911.

Application filed July 3, 1909. Serial No. 505,832.

*To all whom it may concern:*

Be it known that we, BLOOMFIELD BROWER and THEODORE A. WEBER, citizens of the United States, both residing at New York city, county of New York, and State of New York, have invented certain new and useful Improvements in Sharpening Devices for Knives and the Like, fully described and represented in the following specification and the accompanying drawings, forming a part of the same.

This invention relates to improvements in sharpeners for knives and the like, it being the object of the present invention to provide a knife sharpener convenient to handle and manipulate, and by the use of which a blade of the knife or the like may be quickly and easily sharpened.

As a full understanding of the improvements of the present invention can best be had from a detailed description of an organization embodying the same, such description will now be given, reference being had to the accompanying drawing, in which—

Figure 1 is a side elevation of a knife sharpener embodying the improvements of the present invention in their preferred form, the same being shown as in position for use in sharpening a knife or the like; Fig. 2 is a similar view, partly in section; Fig. 3 is an end view looking toward the left of Figs. 1 and 2; Fig. 4 is a detail of one of the sharpening devices; Fig. 5 is a view similar to Fig. 3, illustrating a modification of certain features of the present invention which will be hereinafter referred to; and Fig. 6 is a side elevation of the same, partly in section, and with a portion of the handle of the sharpener omitted.

Referring to said drawing, and particularly to Figs. 1 to 4, $a$ represents a suitable support, and $b$ the handle therefor, the two being suitably secured together to prevent disconnection of one from the other, and also to prevent turning of one relatively to the other, as, for example, by providing the support or pin $a$ with teeth $a'$, which will embed themselves in the wood of the handle and also, by making the pin $a$ and the opening in the handle which receives it square or otherwise non-circular in cross section. The handle $b$ is provided with the usual ferrule $b'$ for strengthening that end of the handle on which pin $a$ is supported. On the outer end of pin $a$ projecting from handle $b$ are mounted a pair of disks $c$ having central openings of the same shape and size as the cross sectional shape and size of the outer end of pin $a$ so that they cannot turn on the latter or relatively to handle $b$. These disks $c$ are made of highly hardened sheet steel and for greater strength and rigidity are stiffened at their outer edges preferably by being made concavo convex, and are mounted on the pin $a$ with their convex faces toward each other. They are rigidly held in place on pin $a$ against endwise movement relatively to each other, or to pin $a$, by a nut $d$ threaded on the extreme outer end of pin $a$, and a pair of dish shaped spring metal washers $e$, one interposed between the nut $d$ and the outer disk $c$, and the other between the ferruled end $b'$ of handle $b$ and the other disk $c$. Each of these washers is offset or provided with a hub portion for engagement by the nut $d$ and the ferruled end $d'$ of handle $b$, as the case may be, and each is made preferably of substantially the same diameter as the disk $c$ which it engages so as to bear against the disk $c$ for some distance inside its periphery and thus rigidly support such portion of the disk so as to prevent springing thereof or breakage thereof during sharpening operations. Interposed between the ferruled end $b'$ of the handle $b$ and the washer $e$ engaging the inner disk $c$ is a collar $f$ on which is loosely mounted an arm $g$ provided at its lower end with a rest $h$, by which the sharpener, held in the hand through handle $b$, is supported firmly on a table or other selected place while being used for sharpening a knife or like blade. Rest $h$ not only aids in so supporting the sharpener, but is made of dish shape so as to provide a receptacle $h'$ for the metal particles removed from the blade. The collar $f$ has an annular periphery and is of such thickness endwise relatively to arm $g$ that the latter will be free to turn upon it and without interference from the ferruled end $b'$ of the handle $b$ or the washer $e$, so that the person using the sharpening device can readily turn the handle $b$ and therefore disks $c$ so as to bring fresh portions of the latter into sharpening position as desired. The sharpening means provided consist of projections $i$ struck up from disks $c$ so as to provide substantially radial sharpening edges $j$. The projections $i$ of the two disks alternate with each other, with the projections of each disk extending inwardly into the vertical plane of the projections of the other disk, or into the spaces between the latter projections, so as to provide, as shown in Fig. 2, a substantially V-shaped path or peripheral recess between the two disks for the reception of the knife or other blade.

One of the principal advantages of the construction of disk illustrated in Figs. 1 to 4 is that the sharpening projections $i$ being struck-up from said disk between the center and the edge thereof, all of the said sharpening projections are provided with a strong, rigid and durable support, reducing to the minimum any likelihood of the projections becoming displaced or detached from the disk after repeated use, which would not be the case if the radial cuts in the disk extended to the edge thereof. The rigidity and durability of this support, and, therefore, of these sharpening projections, is further increased by the stiffening of the disk at its outer edges, as by flanging the disk or making it dish-shaped, as shown.

The operation of using the sharpener is as follows: The handle being grasped with the left hand, and the rest $g$, $h$ placed on a table or the like, the knife to be sharpened is then introduced into the V-shaped space between the two disks and moved back and forth therein with its edge in engagement with the sharpening edges $j$ of the projections $i$, this movement of the knife being continued until it has been sharpened to the desired degree. During the sharpening operation the user of the device will, by his hold upon the handle $b$, prevent turning of such handle and the disks $c$, but as he may desire to bring fresh projections $i$ into sharpening position, he may readily do so by turning the handle $b$ and disks $c$ on the rest $g$, $h$.

In the modification illustrated in Figs. 5 and 6 embodying some of the features of the present invention the disks $c'$, $c'$, are of somewhat different shape from those of the preceding figures, and are mounted on a pin $a^2$ in a somewhat different manner. They consist of highly hardened sheet steel and are concavo-convex with their concave faces toward each other. Each of them has radial projections $i'$, those of one alternating with and projecting into the vertical plane of those on the other disk so as to provide a V-shaped peripheral recess for the reception of the knife or other blade. These two disks are supported upon the pin $a^2$ by nuts $d'$, $d^2$, $d^3$, the turning of the disks relatively to the pin $a^2$ being prevented by an arm $k$ fixed to the pin $a^2$, and the upper end of which enters an opening in the inner disk $c'$. A spring washer $e'$ is also provided for engaging and supporting the outer disk $c'$, and, through the latter, the inner disk $c'$ against breakage or any tendency to spring during a sharpening operation.

What is claimed is:—

1. A sharpening device for knife and like blades comprising a suitable support, and two members of hardened sheet steel mounted thereon and each having sharpening projections struck-up from its body beginning at a point inside its edge, with the sharpening projections of one member alternating with and projecting into the plane of the projections on the other member so as to provide a substantially V-shaped sharpening recess for the blade, substantially as described.

2. A sharpening device for knife and like blades comprising a suitable support, and two disks of hardened sheet steel mounted thereon and each having sharpening projections struck-up from its body beginning at a point inside its edge, with the sharpening projections of one disk alternating with and projecting into the plane of the projections on the other disk so as to provide a substantially V-shaped sharpening recess for the blade, substantially as described.

3. A sharpening device for knife and like blades comprising a suitable support, and two disks of hardened sheet steel mounted thereon, each of which has its outer edge stiffened and is provided with sharpening projections struck-up from its body beginning at a point inside its edge, the sharpening projections of one disk alternating with and projecting into the plane of the projections on the other disk so as to provide a substantially V-shaped sharpening recess for the blade, substantially as described.

4. A sharpening device for knife and like blades comprising a suitable support, two disks of hardened sheet steel mounted thereon and each having struck-up sharpening projections, with the sharpening projections of one disk alternating with and projecting into the plane of the projections on the other disk so as to provide a substantially V-shaped sharpening recess for the blade, and a rest for said disks on which they may be turned to bring desired sharpening projections into sharpening position, said rest being provided with a receptacle for the metal particles removed from the blade during the sharpening operation, substantially as described.

5. A sharpening device for knife and like blades comprising a suitable support, a rotary sharpening implement mounted thereon, and a rest for said sharpening implement on which it may be turned to bring desired sharpening portions into sharpening position, said rest being provided with a receptacle for the metal particles removed from the blade during the sharpening operation, substantially as described.

6. A sharpening device for knife and like blades comprising a pair of disks c provided with sharpening projections i struck-up from its body beginning at a point inside its edge, a suitable support for said disks, and a spring washer e on such support and engaging one of said disks for supporting and steadying the disks, substantially as described.

7. A sharpening device for knife and like blades comprising a pair of disks c provided with sharpening projections i struck-up from its body beginning at a point inside its edge, a suitable support for said disks, a spring washer e on such support and engaging one of said disks for supporting and steadying the disks, and a rest g, h for said disks and their support and on which said disk and support are free to turn, said rest being provided with a receptacle h', substantially as described.

In testimony whereof, we have hereunto set our hands in the presence of two subscribing witnesses.

BLOOMFIELD BROWER.
THEODORE A. WEBER.

Witnesses as to Bloomfield Brower:
  J. A. GRAVES,
  P. N. TILDEN.

Witnesses as to Theodore A. Weber:
  J. A. GRAVES,
  E. C. VANDERHOEF.

Copies of this patent may be obtained for five cents each, by addressing the "Commissioner of Patents, Washington, D. C."